United States Patent
Taylor et al.

(10) Patent No.: US 8,160,923 B2
(45) Date of Patent: Apr. 17, 2012

(54) VIDEO ADVERTISEMENTS

(75) Inventors: Karen Padham Taylor, Los Gatos, CA (US); Manish Gupta, Santa Clara, CA (US); Daniel Dulitz, Mountain View, CA (US); Steve Okamoto, San Jose, CA (US); Rajas Moonka, San Ramon, CA (US); Susan Wojcicki, San Ramon, CA (US)

(73) Assignee: Google Inc., Mountain View, CA (US)

( * ) Notice: Subject to any disclaimer, the term of this patent is extended or adjusted under 35 U.S.C. 154(b) by 838 days.

(21) Appl. No.: 12/016,708

(22) Filed: Jan. 18, 2008

(65) Prior Publication Data

US 2009/0119166 A1    May 7, 2009

Related U.S. Application Data

(60) Provisional application No. 60/985,438, filed on Nov. 5, 2007.

(51) Int. Cl.
  *G06Q 30/00* (2012.01)
(52) U.S. Cl. .......................................... 705/14.4; 705/1.1
(58) Field of Classification Search .................. 705/1.1, 705/14.4
  See application file for complete search history.

(56) References Cited

U.S. PATENT DOCUMENTS

| | | | |
|---|---|---|---|
| 6,269,361 B1 * | 7/2001 | Davis et al. ........................... 1/1 |
| 6,463,585 B1 * | 10/2002 | Hendricks et al. .............. 725/35 |
| 7,124,125 B2 | 10/2006 | Cook et al. |
| 2003/0067554 A1 * | 4/2003 | Klarfeld et al. ................ 348/461 |
| 2003/0093792 A1 * | 5/2003 | Labeeb et al. .................. 725/46 |
| 2004/0030599 A1 * | 2/2004 | Sie et al. .......................... 705/14 |
| 2005/0097204 A1 * | 5/2005 | Horowitz et al. ............. 709/223 |
| 2005/0144064 A1 * | 6/2005 | Calabria et al. ................. 705/14 |
| 2005/0144065 A1 * | 6/2005 | Calabria et al. ................. 705/14 |
| 2005/0144069 A1 * | 6/2005 | Wiseman et al. ............... 705/14 |
| 2006/0031214 A1 | 2/2006 | Solaro et al. |
| 2006/0149721 A1 | 7/2006 | Langford |
| 2006/0224445 A1 * | 10/2006 | Axe et al. ........................ 705/14 |
| 2006/0256133 A1 | 11/2006 | Rosenberg |
| 2006/0282328 A1 * | 12/2006 | Gerace et al. ................... 705/14 |
| 2007/0027754 A1 * | 2/2007 | Collins et al. ................... 705/14 |

(Continued)

FOREIGN PATENT DOCUMENTS

KR    10-2000-0036647 A1    7/2000

(Continued)

OTHER PUBLICATIONS

PCT International Search Report and Written Opinion of the International Searching Authority, PCT/US2008/087175, mailed Apr. 29, 2009, 13 pages.

(Continued)

*Primary Examiner* — Jagdish Patel
*Assistant Examiner* — Sara Chandler
(74) *Attorney, Agent, or Firm* — Fish & Richardson P.C.

(57) ABSTRACT

A query including one or more keywords is received. An advertisement associated with the one or more keywords is identified, and display data for displaying the advertisement is generated and a determination is made as to whether the advertisement is associated with a video. Video selection data is generated for displaying the video proximate to the advertisement if the advertisement is determined to be associated with the video, and the display data and the video selection data are provided.

14 Claims, 7 Drawing Sheets

U.S. PATENT DOCUMENTS

| | | | |
|---|---|---|---|
| 2007/0055695 A1 | 3/2007 | Dorai et al. | |
| 2007/0129995 A1 | 6/2007 | Brandow | |
| 2007/0130159 A1 | 6/2007 | Gulli et al. | |
| 2007/0157228 A1* | 7/2007 | Bayer et al. | 725/34 |
| 2007/0162335 A1* | 7/2007 | Mekikian | 705/14 |
| 2007/0226053 A1 | 9/2007 | Carl et al. | |
| 2008/0154889 A1 | 6/2008 | Pfeiffer | |
| 2008/0222199 A1* | 9/2008 | Tiu et al. | 707/104.1 |
| 2008/0249832 A1 | 10/2008 | Richardson et al. | |
| 2009/0019034 A1 | 1/2009 | Franks et al. | |
| 2009/0037262 A1* | 2/2009 | Patil | 705/14 |
| 2009/0037263 A1* | 2/2009 | Patil | 705/14 |
| 2009/0043649 A1* | 2/2009 | Wright et al. | 705/14 |
| 2009/0076886 A1* | 3/2009 | Dulitz et al. | 705/10 |
| 2009/0089161 A1* | 4/2009 | Ali et al. | 705/14 |
| 2009/0099909 A1* | 4/2009 | Phan | 705/14 |
| 2009/0106100 A1* | 4/2009 | Mashinsky | 705/14 |
| 2010/0082439 A9* | 4/2010 | Patel et al. | 705/14.72 |
| 2011/0026588 A1 | 2/2011 | Boyce | |

FOREIGN PATENT DOCUMENTS

| | | |
|---|---|---|
| KR | 10 2003 0029410 | 4/2003 |
| KR | 10-2003-0071591 A1 | 9/2003 |
| WO | WO 2004/068299 A2 | 8/2004 |
| WO | WO 2005/057238 A2 | 6/2005 |
| WO | WO 2006/062760 A2 | 6/2006 |

OTHER PUBLICATIONS

PCT International Search Report and The Written Opinion of The International Searching Authority, PCT/US2008/87253, mailed Aug. 26, 2009, 11 pages.

U.S. Appl. No. 12/271,395, filed Nov. 14, 2008, Liao et a.

Notification Concerning Transmittal of International Preliminary Report on Patentability, PCT/US2008/087253, Jul. 22, 2010, 6 pages.

International Search Report and the Written Opinion of the International Searching Authority, or the Declaration for PCT/US2009/064130 dated May 31, 2010 (11 pages).

Notification Concerning Transmittal of International Preliminary Report on Patentability, PCT/US2008/087175, Jul. 1, 2010, 8 pages.

U.S. Appl. No. 11/970,170, filed Jan. 7, 2008, Taylor et al.

U.S. Appl. No. 11/959,871, filed Dec. 19, 2007, Taylor et al.

Arrington, Michael, "Google PPC Video Ads—Why I'm Betting Against It", May 23, 2006, TechCrunch, 13 pages.

Notification Concerning Transmittal of International Preliminary Report on Patentability for PCT/US2008/082519 dated May 20, 2010, 7 pages.

Notification Concerning Transmittal of International Preliminary Report on Patentability for PCT/US2009/064130 dated May 26, 2011, 6 pages.

* cited by examiner

VIDEO ADVERTISEMENTS

CROSS-REFERENCE TO RELATED APPLICATION

This application claims priority to U.S. Provisional Patent Application Ser. No. 60/985,438 filed Nov. 5, 2007, and entitled "VIDEO ADVERTISEMENTS," the contents of which are incorporated herein by reference.

BACKGROUND

This disclosure relates to information retrieval.

Content items, e.g., advertisements, can be identified by a search engine in response to a query by a user. The query can include one or more search terms, and the search engine can identify and rank the content items based on the search terms, e.g., keywords, in the query and on one or more parameters associated with the content item.

Sometimes a user that submitted the query cannot determine whether the advertisements that are displayed are actually relevant to the user's query. For example, the user may have performed the query to identify a movie to potentially purchase. While an advertisement related to the movie may be identified, the advertisement may not contain enough information for the user to decide if the movie is one that the user would actually enjoy enough to warrant purchasing.

SUMMARY

Disclosed herein are systems, apparatus, computer program products and methods for identifying videos associated with advertisements. In an implementation, a query including one or more keywords is received (e.g., from a client device). An advertisement associated with the one or more keywords is identified. Display data for displaying the advertisement (e.g., at the client device) is generated, and a determination is made as to whether the advertisement is associated with a video. Video selection data is generated for displaying the video proximate to or within the advertisement (e.g., at the client device) if the advertisement is determined to be associated with the video, and the display data and the video selection data are provided (e.g., to the client device).

In another implementation, a first query including one or more keywords is issued. An advertisement associated with the one or more keywords is received and displayed in response to the first query. A video element is displayed proximate to or within the advertisement. In response to receiving a selection of the video element, a video associated with the advertisement is displayed in, for example, an enlargement area proximate to the advertisement.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
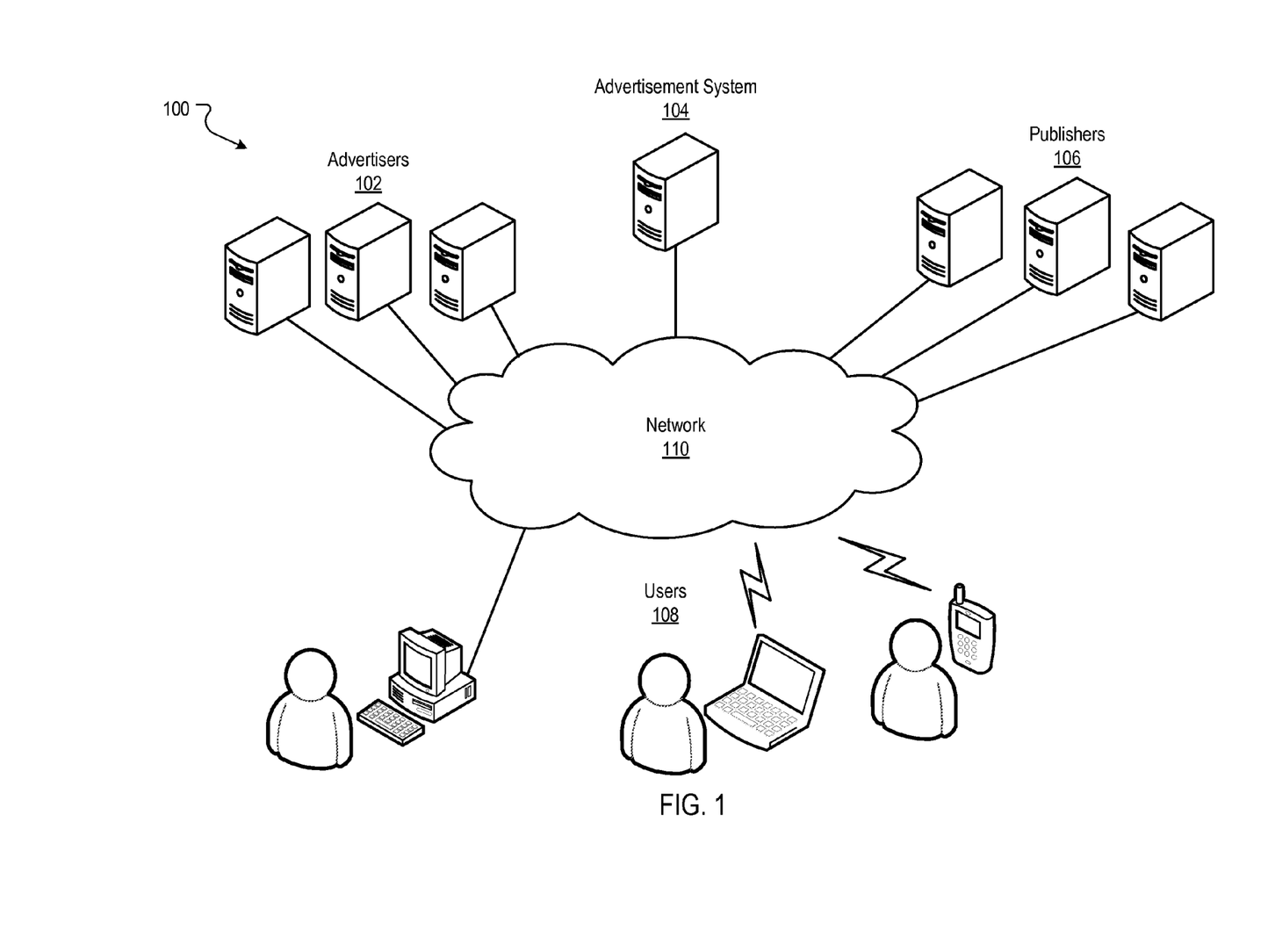
FIG. 1 is a block diagram of an example online content delivery system.

FIG. 1 is a block diagram of an example online content delivery (e.g., advertising) system 100. The system 100 provides sponsored content in response to, for example, a query. By way of example, the sponsored content can be in the form of advertising or advertisements ("ads"). By way of example only, the system is described with reference to providing advertisements, though the system 100 can provide other forms of content, including other forms of sponsored content. A computer network 110, such as a local area network (LAN), wide area network (WAN), the Internet, or a combination thereof, connects the advertisers 102, an advertisement system 104, publishers 106, and users devices 108.

In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. The system 104 responds by sending advertisements (e.g., when an associated publication is rendered) to the requesting publisher 106 for placement on one or more of the publisher's web properties (e.g., websites and other network-distributed content). As discussed above, while reference is made to advertisements, other content items can be provided by the system 104.

Other entities, such as user devices 108 and the advertisers 102, can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

A click-through can occur, for example, when a user of a user device 108 selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's Web page and consummates a purchase there before leaving that Web page. Alternatively, a conversion may be defined as a user being shown an advertisement, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product inquiry, etc. Other definitions of what constitutes a conversion are possible.

A conversion rate can be defined as the ratio of the number of conversions to the number of impressions of the advertisement (i.e., the number of times an advertisement is rendered) or the ratio of the number of conversions to the number of selections (or the number of some other earlier event).

Other usage information and/or performance metrics can also be used. The usage information and/or performance metrics can, for example, be revenue related or non-revenue related. In some implementations, the performance metrics can be parsed according to time, e.g., the performance of a particular content item may be determined to be very high on weekends, moderate on weekday evenings, but very low on weekday mornings and afternoons.

This usage information can include measured or observed user behavior related to advertisements that have been served. The system 104 performs financial transactions, such as crediting the publishers 106 and charging the advertisers 102 based on the usage information.

One example of a publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104, or embed code in the rendered page for the user device 108 to execute and retrieve the ads. The advertisement request may include a number of advertisements desired. The advertisement request may also include content request information. This information can include the content itself (e.g., page or other content document), a pointer to the content by way of a uniform resource locator ("URL"), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. In other implementations, a user device 108 executing a browser can combine the requested content with the advertisement. This combined content and advertisements can be sent/presented to the user 108 that requested the content. The content server can transmit information about the advertisements back to the advertisement server, including information describing how, when, and/or where the advertisements are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 104. This combined information can then be forwarded to the user devices 108 that requested the content. The search results can be maintained as distinct from the advertisements, so as not to confuse the user between paid advertisements and neutral search results.

Finally, the search service can transmit information about the advertisement and when, where, and/or how the advertisement was to be rendered back to the system 104.

As can be appreciated from the foregoing, the advertising system 104 can serve publishers 106 such as content servers and search services. The system 104 permits serving of advertisements targeted to content (e.g., documents) served by content servers or in response to search queries provided by users. For example, a network may include an advertisement server serving targeted advertisements in response to requests from a search service with advertisement spots for sale.

In some implementations, the advertisement system 104 may serve advertisements that include videos associated with the advertisements. Videos associated with an advertisement may be displayed one the user device 108 when the associated advertisement is displayed. In some implementations, the user device 108 may include interaction mechanism to control when such videos are displayed. Such an interaction mechanism can be realized, for example, by selection data that is operable to display videos associated with the advertisement in an enlargement area, e.g., a user interface element that can expand or contract, proximate to the advertisement. In this way, the user may view a particular advertisement. The advertisement can, for example, be in the form of a creative for an online retailer that sells guitar tuners, in which the creative includes text, graphics, audio and/or video associated with the guitar tuners. The user can decide whether or not to display the associated video, for example, a video to show the user 108 how to use the guitar tuner.

Figure 2:
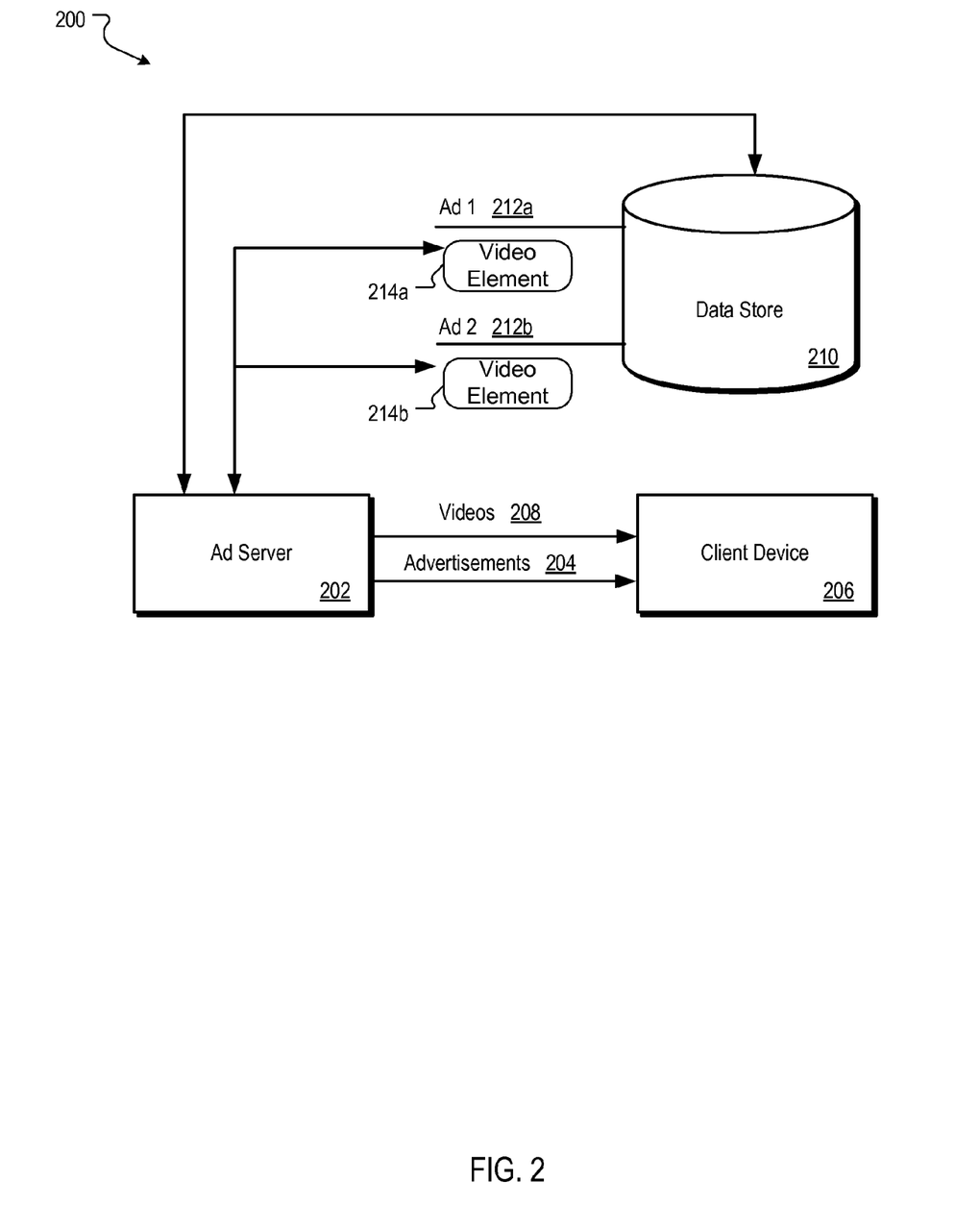
FIG. 2 is a block diagram of an example system that uses video elements to selectively display videos corresponding to advertisements.

FIG. 2 is a block diagram of an example system 200 that uses video elements, e.g., plusboxes, to selectively display videos corresponding to advertisements. The system 200 can, for example, be implemented in the advertisement system 104 utilizing one or more computing devices that include memory devices storing processing instructions and processing devices for executing the processing instructions. An example computing system is shown and described with reference to FIG. 7. Other implementations, however, can also be used.

The system 200 can display an advertiser's video in a way that provides the user with a level of control and interaction for displaying the advertiser's video. For example, when a user receives search results in response to an online search, such as a query entered in a web browser networked with the Internet, the search results can include advertisements. The advertisements can also be associated with a video. In some implementations, the user is presented with a "plusbox" video element within or proximate to (e.g., in time or space) the advertisement. For example, a plusbox can be shown after the advertisement has been displayed for a certain period of time, e.g., 10 seconds. In another example, the plusbox can be shown proximate to or within an area associated with the advertisement when the advertisement is displayed.

In other implementation, other video elements can be presented to the user. For example, the video element can include a thumbnail image associated with the advertiser or products or services sold by the advertiser, a video still image, or a video play button. If the user selects (e.g., clicks on) the video element, the user can see the relevant video for the corresponding advertisement.

In some implementations, the system 200 can allow an advertiser to specify videos related to the advertisement of the advertiser that may be displayed with that advertiser's advertisements. For example, the advertiser 102 can provide videos to the system 200 to display with the advertisements. The videos can, for example, be stored in a data store 210. When the advertisements are displayed, if there is a video associated with the advertisements as specified by the advertiser 102, a video element such as a plusbox, can be displayed. When the user clicks on the video element, e.g., the plusbox, the system 200 can return the video associated with the advertisement. The display can show the video associated with the advertisement.

In some implementations, the video automatically starts to play once the video element is selected. In other implementations, the user has control over when the video starts to play even after the video element is selected. For example, the user may then select to "play" the video with the video controls presented with the video.

In some implementations, the displaying of the video with a video element, e.g., a plusbox, can be monetized. For example, clicks on the video element can be counted as advertisement clicks. Opening or closing the plusbox may also be counted as an advertisement click, or, alternatively, can be free to the advertiser.

In some implementations, the video element feature can be displayed only when the advertisement is associated with a video. For example, suppose an advertiser A that sells online guitar tuners has specified an associated video for its advertisements that shows how to use a guitar tuner and has provided the video to the system 200. Suppose an advertiser D also sells online guitar tuners, but the advertisement of advertiser D are not associated with any videos. Accordingly, the system 200 will not generate selection data that displays a video element indicating that there are videos related to advertiser D, but the system 200 will generate selection data that displays a video element indicating that there are videos related to advertiser A. In this way, the plusbox is shown only when videos are associated with an advertisement.

In some implementations, an advertisement that is associated with a video can be ranked higher than an advertisement that is not associated with a search result. For example, when one or more advertisements are identified in response to a search query, the advertisements that are identified and that are associated with a video can be ranked higher in the list of identified advertisements than the advertisements that are not associated with a video.

In some implementations, an advertiser 102 that wants to opt in to using the video feature may, for example, upload videos related to advertisements to the advertising system 104 using existing mechanisms for file upload, such as an advertising system 104 application program interface (API), or an upload portal, or other uploading interface. For example, if the advertiser 102 already uses the advertising system 104 and wants to include only a subset of the advertisements (e.g., owned by his customer ID), the advertiser 102 can associate the advertisements eligible for the video feature using a special attribute.

In some implementations, the advertiser 102 can further manage the serving of advertisements by specifying an advertising campaign. The advertising campaign can be stored in campaign data in the data store 210, which can, for example, specify adverting budgets for advertisements, when, where, and under what conditions particular advertisements may be served for presentation etc. For example a computer company may design an adverting campaign for a new laptop computer that is scheduled to be released on November 20. The advertising campaign may have a budget of $500,000, and may have 30 different advertisements that are to be served for presentation during the month of November. Such data defining the advertisement campaign can be stored in the campaign data in the data store 210. The advertiser 102 can specify which campaigns should have the video feature enabled and link those campaigns with the desired set of offers from advertising system 104. This metadata can be stored in an advertisements database. The advertiser specifies the customer ID (e.g., Google Base Customer ID) used in the upload.

In some implementations, the system 200 can include an ad server 202 that serves advertisements 204 to a client device 206. The ad server 202 can serve advertisements provided by the advertisers 102 as part of, or in coordination with, the advertisement system 104. The advertisements may be served over the network 110 and displayed a client device 206, such as a laptop, home computer, PDA, cell phone, set top box, game console, portable electronic device, etc.

In some implementations, the ad server 202 can serve videos 208 to the client device 206. The videos 208 may correspond to the advertisements 204 that are identified by the ad server 202 in response to a query. For example, while the advertisements 204 may be advertisements for guitar tuners offered by one or more online merchants that sell guitar tuners, the videos 208 associated with the advertisements 204 may be videos on how to use the guitar tuners.

The advertisements 204 may be stored in the data store 210. For example, the data store 210 can store information for advertisements that the ad server 202 can serve, such as an ad1 212*a* and an ad2 212*b*. When the user 108 requests advertisements or issues a search query that results in the identification of advertisements, such as the ad1 212*a* and/or the ad2 212*b*, the ad server 202 can provide the advertisements 212*a* and 212*b* as advertisements 204. For example, the ad1 212a may be an advertisement for a local music store that advertises online, and the ad2 212b may be an advertisement for a nationwide music store that advertises online. The advertisements 212a and 212b can be displayed on the client device 206 as the result of a search for guitar tuners (e.g., using a search query "guitar tuners") entered in the user's browser.

The ad server 202 can generate video selection data, e.g., data that when rendered on a client device displays one or more video elements 214a and 214b corresponding to the ad1 212a and the ad2 212b, respectively. In some implementations, the video elements 214a and 214b are rendered beneath each of the advertisements 212a and 212b, and as such facilitate the viewing of videos corresponding to displayed advertisements, such as displaying a video on how to use a guitar tuner associated with a guitar tuner advertisement displayed in the user's browser. For example, the user viewing advertisements on the client device 206 may select the video element 214a to display the corresponding video. As a result of selecting such a video element, the ad server 202 can serve the video 208 to the client device 206. Similarly, if the user wants to see the video associated with the ad2 212b, the user can select the video element 214b.

In some implementations, user selection of video elements (e.g., the video element 214b) can be used to update click-through rates. For example, when a user selects a video element, the number of clicks for the associated advertisement may be incremented, thereby increasing the click-through rate associated with the advertisement. In some implementations, individual click-through rates may be maintained in order to track the performance of the advertisements. Alternatively, the interactions with the video elements can be separately tracked.

In some implementations, the ad server 202 can generate video information data, e.g., data that when rendered on a client device displays one or more video information elements (e.g., a tab element as described in FIG. 3) corresponding to the videos displayed by the video elements 214a and 214b. In some implementations, the video information elements are rendered adjacent, beneath, within or next to each of the videos displayed by the video elements 214a and 214b, and as such facilitate the viewing of information corresponding to the displayed videos, such as displaying information associated with the products in the videos. For example, if a user selects the video element 214a to display the corresponding video, e.g., a video on how to use guitar tuners, the user can select a corresponding video information element to display local merchants that sell the particular video.

In summary, the system 200 of FIG. 2 can facilitate the provisioning of advertisements and related videos in a variety of ways. For example, a client device 206 can send a query including one or more keywords to ad server 202. The ad server 202 can use the keywords to find an advertisement from a data store 210. The ad server 202 can determine whether a video is associated with the advertisement. The ad server 202 can then send the advertisement and the video associated with the advertisement, if a video is available, to the client device 206. The client device 206 can display the advertisement and, if a video is available, a video element associated with the video to display the video.

In some implementations, the system 200 may wait to send the video 208 to the client device until after the user selects the video element 214a or 214b. Selection of a video element can cause the client device 206 to generate data indicating such a selection. The ad server 202 can receive the data, and in response, issue a request to the ad server 202 to send the associated video to the client device 206.

Figure 3:
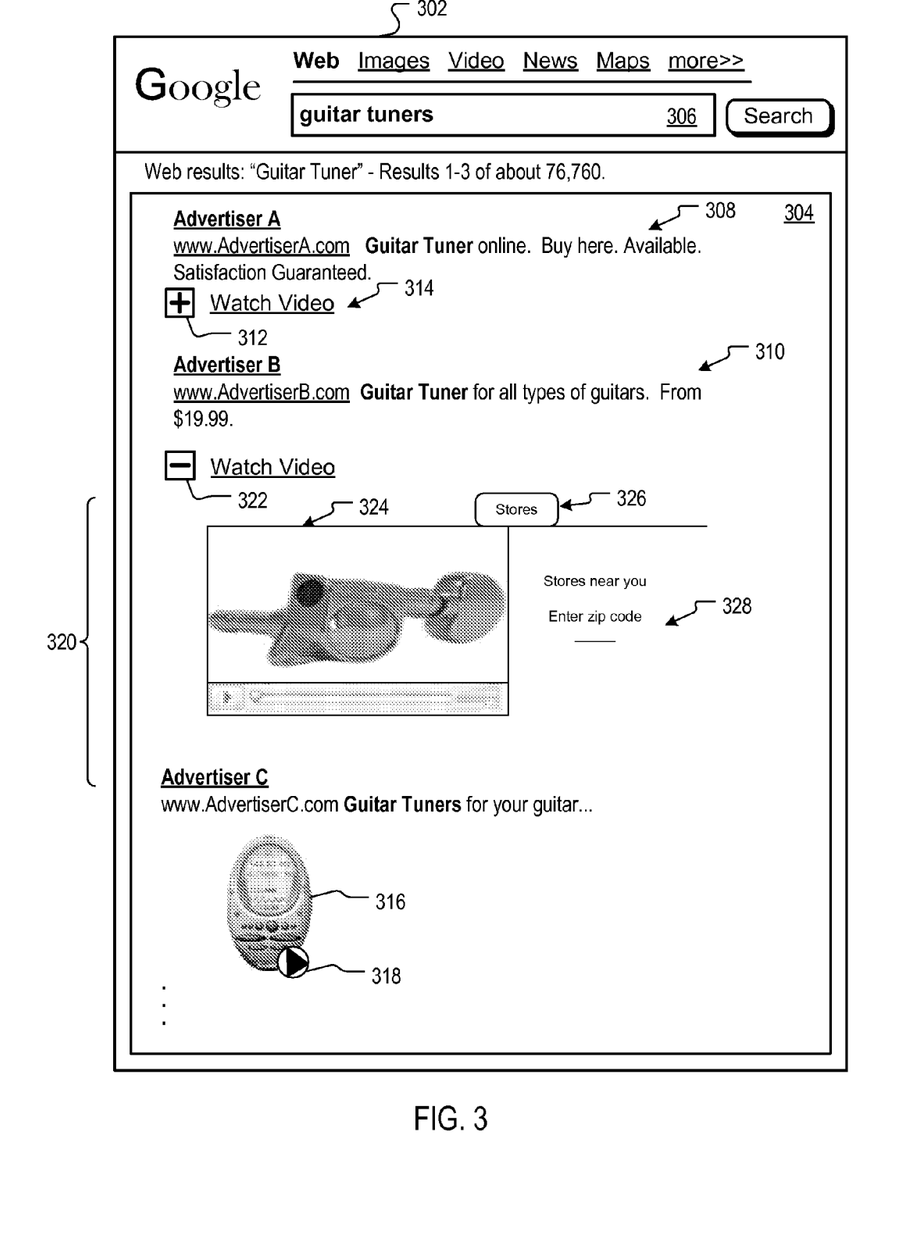
FIG. 3 is an example screen shot that includes video elements used to display videos corresponding to advertisements.

FIG. 3 is an example screen shot 302 that includes video elements (e.g., plusboxes) used to display videos corresponding to advertisements. For example, the screen shot 302 may be displayed in a browser on a client device 206, such as a smart phone, a personal computer, a personal digital assistant (PDA), or some other wired or wireless electronic device. The screen shot 302 includes a search results area 304 that can display search results. For example, the search results displayed in the search results area 304 may be in response to a specific search query, such as a "guitar tuners" search term 306 that the user may enter in a browser to locate guitar tuners to purchase online. In response to the search term 306, the system can display advertisements that are deemed relevant the query.

For example, the system can display advertisements 308 and 310 for an advertiser A and an advertiser B. Such advertisements can include search terms from the search term 306, and may further highlight (e.g., by bolding, highlighting or the like) individual terms from the search query. As depicted, the search terms "Guitar Tuners" are highlighted with bolding in the advertisements for the advertiser A and the advertiser B.

Initially, when advertisements are displayed in the search results area 304, the advertisements may be displayed in a way similar to that depicted in the advertisement 308 for advertiser A. As such, the advertisement may contain the name of the advertiser (e.g., "Advertiser A"), one or more links to individual landing pages associated with the advertiser (e.g., home page "www.AdvertiserA.com"), a video corresponding to goods offered by the advertiser, and one or more controls that the user may select to view videos corresponding to the advertisement. As depicted in the advertisements 308 and 310, video elements include a plusbox 312, a minus box 322, and an action prompt 314. Video elements can also include a thumbnail image 316, or a video play button 318. If the user is interested in viewing a video corresponding to an advertisement, the user may select the plusbox 312, the action prompt 314, the thumbnail image 316, or the video play button 318 to display the corresponding video.

The advertisement 310 for the advertiser B depicts an example display that may result from the user selecting one of the video elements, e.g., a plusbox, such as the plusbox 312. Specifically, the advertisement 310 for the advertiser B includes an enlargement area 320. The enlargement area 320 can include a video 324. The video 324 can, for example, be displayed underneath the advertisement 310 for the advertiser B. In some implementations, the video 324 can be displayed next to the advertisement or other areas proximate to the video 324. The video 324 can include the information associated with one of the products of the advertiser B.

The video enlargement area 320 can, for example, be proportional to the size, e.g., aspect ratio, of the video 324. For example, the enlargement area 320 is large enough so that the video 324 can be displayed and viewed without obstruction from other parts of the content page on which it is displayed.

In some implementations, the enlargement area 320 can include a video information element, e.g., a tab 326 for displaying product information associated with a product in the video 324. The video information element can, for example, display local stores that an individual can purchase the guitar tuners that are shown in the video 324. The video information element 326 can include or provide other product information. For example, if the video 324 corresponds to a movie, the video information element can show or provide a list of local theatres that are playing the movie. Additional controls may exist for controlling the visual presentation of the video, or to control any audio component of the video's presentation, or other such features.

The minusbox 322 is included in the advertisement 310 for the advertiser B. The minusbox 322 display may replace a plusbox display (e.g., the plusbox 312) when the plusbox is selected and the video corresponding to the advertisement is displayed. The user may select a minusbox to hide (or undisplay) the video currently displayed. For example, a user viewing the video in the enlargement area 320 may hide the video by selecting the minusbox 322. Thus the selection of such video elements can expand and collapse the enlargement area 320. In some implementations, selection of the minusbox 322 will stop the playing of the video, e.g., will terminate a video stream to the client device on which the video 324 was being shown.

Figure 4:
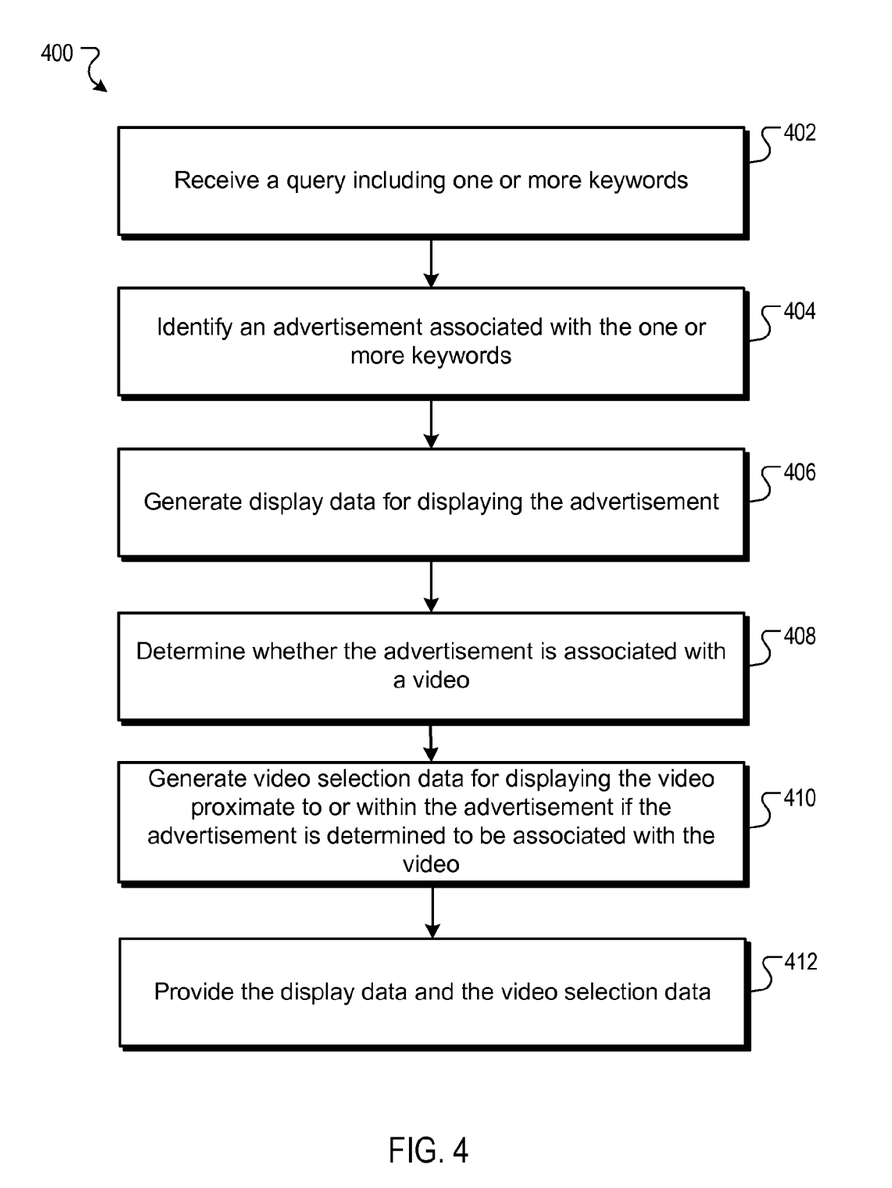
FIG. 4 is a flow diagram of an example process for identifying advertisements and videos associated with the advertisements in response to a query.

FIG. 4 is a flow diagram of an example process for identifying advertisements and videos associated with the advertisements in response to a query. The process 400 can, for example, be implemented in a system such as the system 200 of FIG. 2. The process 400 may, for example, occur on the server side of client-server implementation of the system 200.

Stage 402 receives a query including one or more keywords from, for example, a client device. For example, referring to FIG. 3, the query may be a search query, such as "guitar tuners," that the user enters on a browser on the client device 206 and which is transmitted over a network to the ad server 202.

Stage 404 identifies an advertisement associated with the one or more keywords. For example, the ad server 202 may identify an advertisement 308 for advertiser A. Specifically, identification of the advertisement 308 for advertiser A may occur because the keywords "guitar tuners" are in the advertisement.

Stage 406 generates display data for displaying the advertisement, for example. at the client device. For example, the ad server 202 can generate display data for displaying the advertisement at the client device 206.

Stage 408 determines whether the advertisement is associated with a video. For example, the ad server 202 can determine whether the advertisement is associated with a video.

Stage 410 generates video selection data for displaying the video (e.g., proximate to or within the advertisement at the client device 206) if the advertisement is determined to be associated with the video. For example, the ad server 202 can generate the video selection data for displaying the video, for example, underneath the advertisement at the client device if the advertisement is determined to be associated with the video.

Stage 412 provides the display data and the selection data (e.g., to the client device). For example, the ad server 202 can transmit the display data and the selection data to the client device 206 for rendering on a display device.

Figure 5:
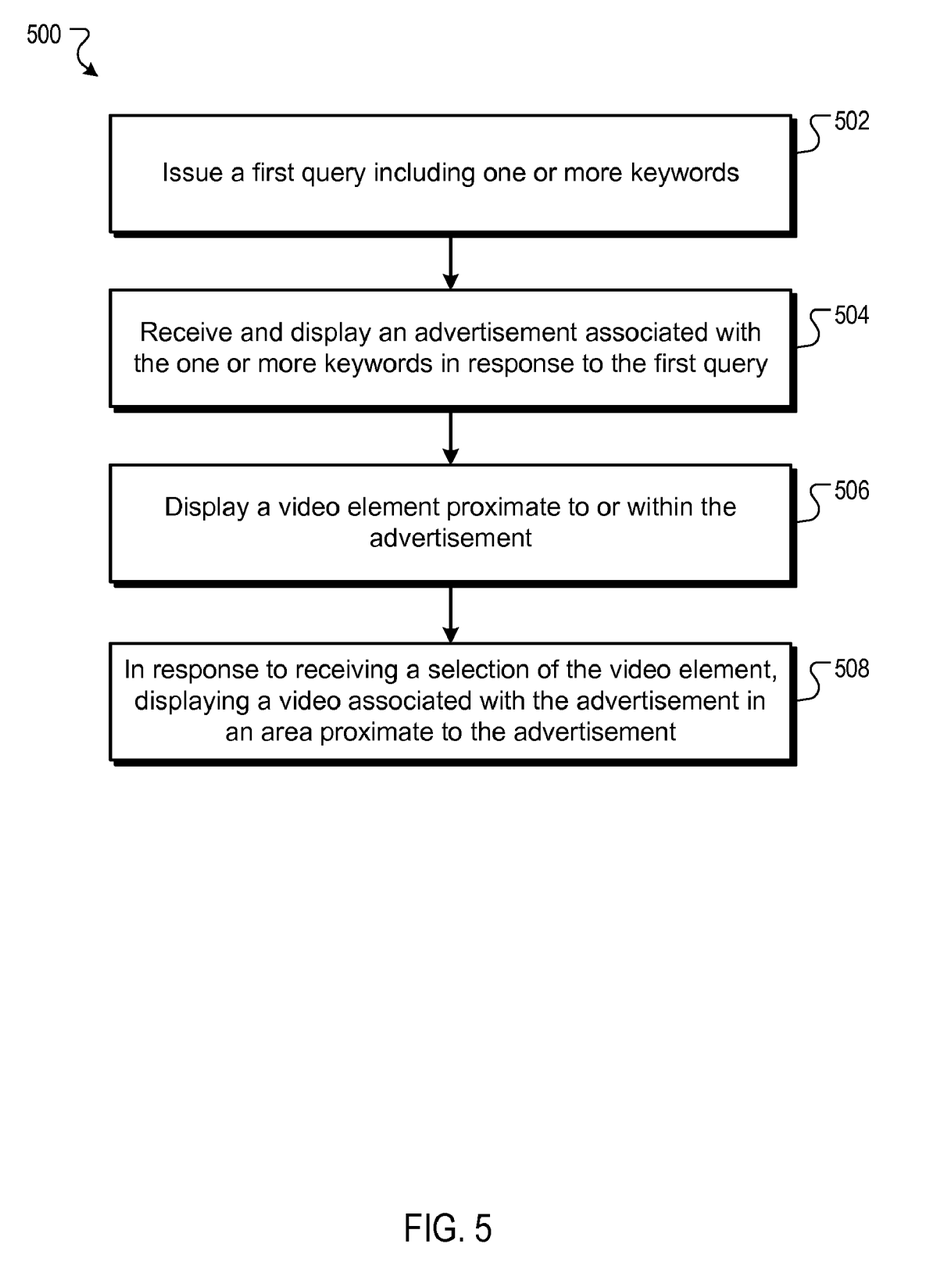
FIG. 5 is another flow diagram of an example process for identifying advertisements and videos associated with the advertisements in response to a query.

FIG. 5 is another flow diagram of an example process 500 for identifying advertisements and videos associated with the advertisements in response to a query. The process 500 may, for example, occur on the client side of client-server implementation of the system 200.

Stage 502 issues a first query including one or more keywords. For example, referring to FIG. 3, the first query issued may be a search query, such as "guitar tuners," that the user enters on a browser on the client device 206.

Stage 504 receives and displays an advertisement associated with the one or more keywords in response to the first query. For example, the client device 206 may receive and display the advertisement 308 for advertiser A. Specifically, identification of the associated advertisement 308 for advertiser A may occur because the keywords "guitar tuners" are in the advertisement.

Stage 506 displaying a video element proximate to or within the advertisement. For example, the client device 206 can display the plusbox 312 beneath the advertisement 308 for Advertiser A. The client device 206 can also display the action prompt 314, such as "Watch Video."

Stage 508, in response to receiving a selection of the video element, displays a video associated with the advertisement in, for example, an enlargement area proximate to the advertisement. For example, in response to the user selection of the action prompt 314 (or the plusbox 312), the client device 206 can display the video associated with the advertisement 308 for advertiser A. The display can, for example, be placed beneath or adjacent to the action prompt 314 (or the plusbox 312).

Figure 6:
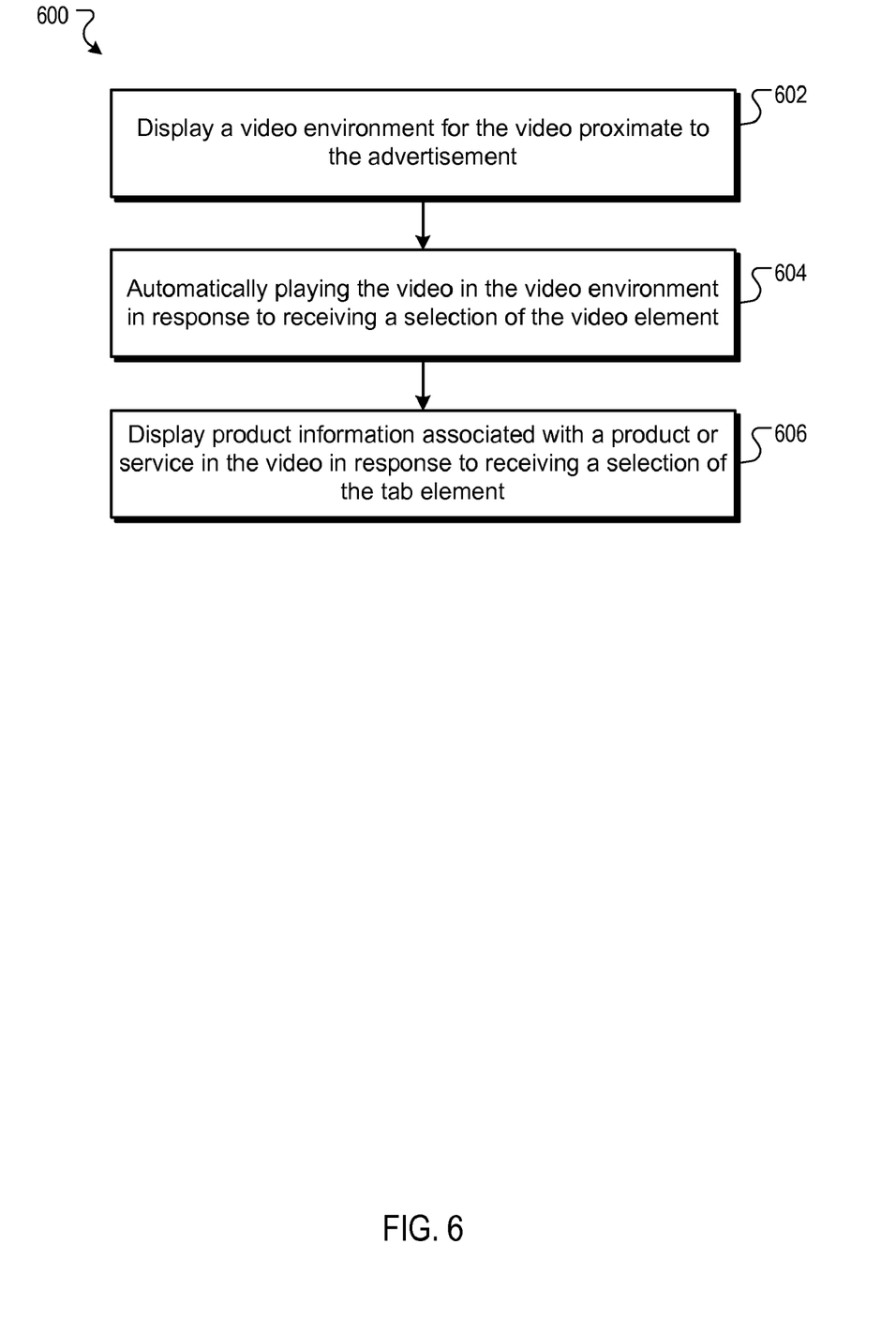
FIG. 6 is a flow diagram of an example process for displaying and playing a video associated with an advertisement in an enlargement area proximate to the advertisement.

FIG. 6 is a flow diagram of an example process 600 for displaying and playing a video associated with an advertisement in an enlargement area proximate to the advertisement. The process 600 may, for example, occur on the client side of client-server implementation of the system 200.

Stage 602 displays a video environment for the video proximate to the advertisement. For example, the client device 206 can display the video environment 320 proximate to the advertisement 310.

Stage 604 automatically plays the video in the video environment in response to receiving a selection of the video element. For example, the client device 206 can automatically play the video 324 in the video environment 320 in response to receiving a selection of the video element 322. The video environment can, for example, include a tab element 326 that is displayed adjacent to the video 324.

Stage 606 displays product information associated with a product in the video in response to receiving a selection of the tab element. For example, the client device 206 can display product information 328 associated with a product in the video 322 in response to receiving a selection of the tab element 326.

Figure 7:
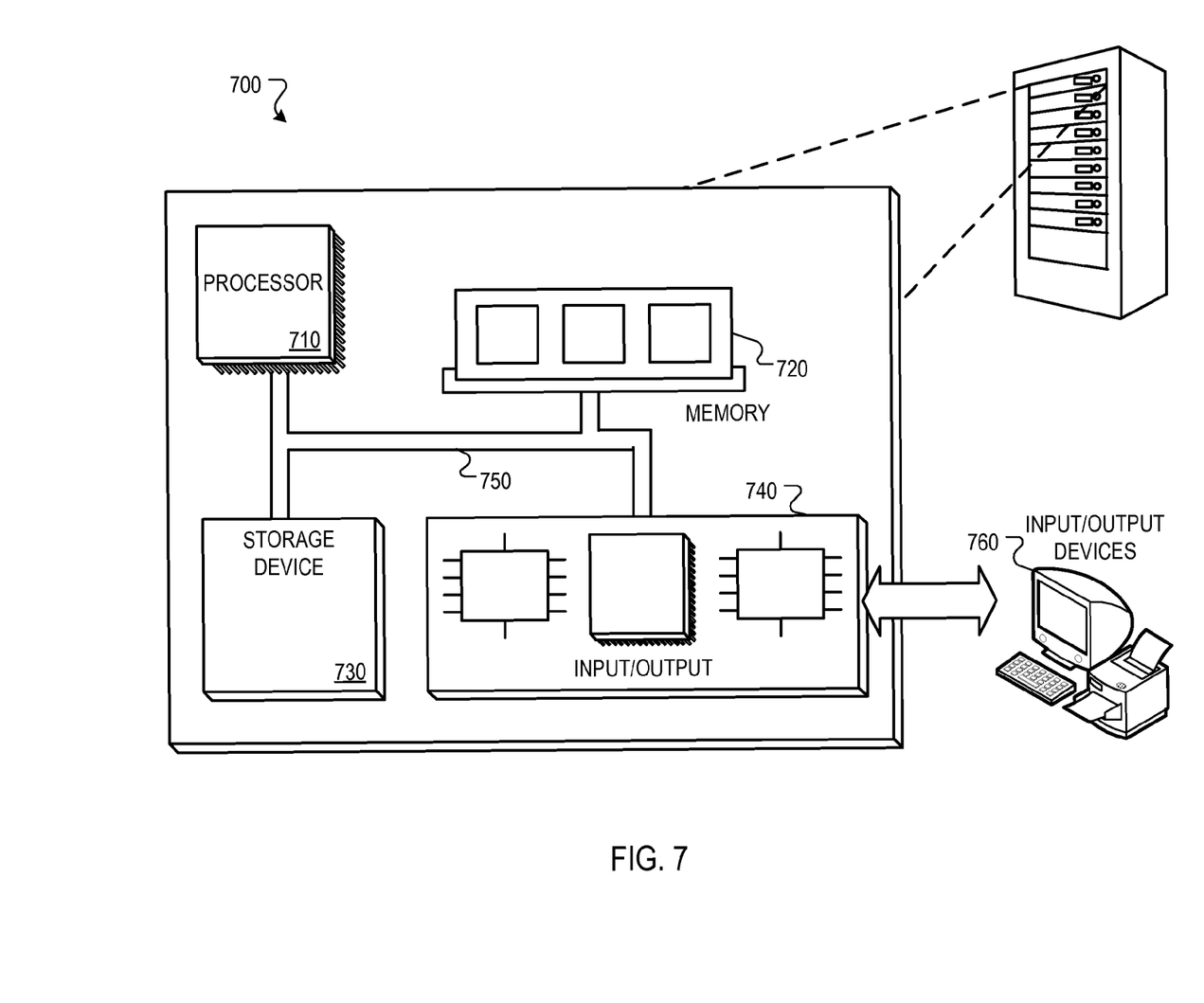
FIG. 7 is a schematic diagram of an example computer system that can be utilized to implement the systems and methods described herein.

FIG. 7 is a schematic diagram of an example computer system 700 that can be utilized to implement the systems and methods described herein. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In some implementations, the processor 710 is a single-threaded processor. In other implementations, the processor 710 is a multi-threaded processor. The processor 710 is capable of processing instructions stored in the memory 720 or on the storage device 730.

The memory 720 stores information within the system 700. In some implementations, the memory 720 is a computer-readable medium. In other implementations, the memory 720 is a volatile memory unit. In still other implementations, the memory 720 is a non-volatile memory unit.

The storage device 730 is capable of providing mass storage for the system 700. In some implementations, the storage device 730 is a computer-readable medium. In various different implementations, the storage device 730 can, for example, include a hard disk device, an optical disk device, or some other large capacity storage device.

The input/output device 740 provides input/output operations for the system 700. In some implementations, the input/output device 740 can include one or more network interface devices, e.g., an Ethernet card, a serial communication device, e.g., and a RS-232 port, and/or a wireless interface device, e.g., and an 802.11 card. In other implementations, the input/output device can include driver devices configured to receive input data and send output data to other input/ output devices, e.g., keyboard, printer and display devices 760. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used.

Furthermore, the features and methods described can also be used in another form of online advertising such as ad syndication, which allows advertisers to extend their marketing reach by distributing advertisements to additional partners. For example, third party online publishers can place an advertiser's text or image advertisements on web properties with desirable content to drive online customers to the advertiser's website. An example of such a system is AdSense™ offered by Google, Inc. The features and methods described above can be used to allow the display of video elements along with the advertisements placed on the publisher's websites.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   accessing advertising campaign data from an advertiser, wherein the advertising campaign data specify one or more videos selected by the advertiser as being eligible to be displayed with an advertisement of the advertiser;
   receiving a query including one or more keywords;
   identifying, by the one or more computers, the advertisement as being associated with the one or more keywords;
   generating, by the one or more computers, display data for displaying the advertisement;
   determining, by the one or more computers, whether the advertisement is associated with a video eligible to be displayed with the advertisement based on the advertising campaign data;
   in response to determining that the advertisement is associated with a video eligible to be displayed with the advertisement:
      generating, by the one or more computers, video selection data for displaying the video proximate to or within the advertisement; and
      providing the display data for displaying the advertisement and
      the video selection data for displaying the video; and
   in response to determining that the advertisement is not associated with a video eligible to be displayed with the advertisement, providing the display data without video selection data.

2. The method of claim 1, wherein generating, by the one or more computers, video selection data comprises:
   generating instructions for a client device; and
   providing the instructions to the client device, wherein in response to receiving the instructions the client device displays a video element and displays the video associated with the advertisement proximate to the advertisement in response to a selection of the video element.

3. The method of claim 2, further comprising:
   generating video information data for displaying a video information element proximate to the video at the client device; and
   providing the video information data to the client device, wherein in response to receiving the video information data and a selection of the video information element, the client device displays video information associated with the video proximate to the video.

4. The method of claim 3, wherein the video information element is a tab element and the video information is information associated with a product or service in the video.

5. The computer implemented method of claim 1, further comprising generating a performance metric for the advertisement, wherein the performance metric is a click-through rate derived from a number of users that clicked on the advertisement.

6. The computer implemented method of claim 5, wherein the performance metric is further derived from a number of users that clicked on the video.

7. The computer implemented method of claim 1, further comprising generating a performance metric for user interactions with the video and a separate performance metric for user interactions with the advertisement.

8. The computer implemented method of claim 1, further comprising:
   ranking the advertisement higher than another advertisement based on the campaign data for the advertisement specifying that videos are eligible to be displayed with the advertisement and campaign data for the another advertisement not specifying that videos are eligible to be displayed with the another advertisement.

9. The computer implemented method of claim 1, further comprising:
   generating search results data for displaying search results responsive to the one or more keywords; and
   providing the search results data for displaying the search results, the display data for displaying the advertisement and the video selection data for displaying the video to a client device.

10. A system, comprising:
    a data store configured to store advertisements and videos associated with the advertisements, the association based on advertising campaign data associating the advertisements with videos and enabling the display of the videos with the advertisements; and
    an advertisement engine comprising instructions executable by a processing system and stored in a computer readable medium, the processing system in data communication with the data store, wherein upon execution the instructions instruct the processing system to:
       access advertising campaign data from an advertiser, wherein the advertising campaign data specify one or more videos selected by the advertiser as being eligible to be displayed with a advertisement of the advertiser;
receive a query including one or more keywords;
identify a advertisement associated with the one or more keywords;
generate display data for displaying the advertisement;
determine whether the advertisement is associated with a video eligible to be displayed with the advertisement based on the advertising campaign data;
in response to a determination that the advertisement is associated with a video eligible to be displayed with the advertisement:
    generate video selection data for displaying the video proximate to the advertisement; and
    provide the display data and the video selection data; and
in response to a determination that the advertisement is not associated with a video eligible to be displayed with the advertisement, provide the display data without video selection data.

11. The system of claim 10, wherein the video selection data comprises instructions for a client device; and
wherein the advertisement engine is further operable to provide the instructions to the client device and in response to receiving the instructions the client device displays a video element and display the video associated with the advertisement proximate to the advertisement in response to a selection of the video element.

12. The system of claim 11, wherein the advertisement engine is further operable to:
generate video information data for displaying video information element proximate to the video at a client device; and
provide the video information data to the client device, wherein in response to receiving the video information data and a selection of the video information element, the client device displays video information associated with the video proximate to the video.

13. The system of claim 12, wherein the video information element is a tab element and the video information is information associated with a product or service in the video.

14. A system, comprising:
a data processing apparatus configured to:
access advertising campaign data from an advertiser, wherein the advertising campaign data specify one or more videos selected by the advertiser as being eligible to be displayed with an advertisement of the advertiser;
receive a query including one or more keywords;
identify the advertisement as being associated with the one or more keywords;
generate display data for displaying the advertisement;
determine whether the advertisement is associated with a video eligible to be displayed with the identified advertisement based on the advertising campaign data;
in response to determining that the advertisement is associated with a video eligible to be displayed with the advertisement:
    generate video selection data for displaying the video proximate to or within the advertisement; and
    provide the display data and the video selection data; and
in response to determining that the advertisement is not associated with a video eligible to be displayed with the advertisement, provide the display data without video selection data.

* * * * *